Figure 1:
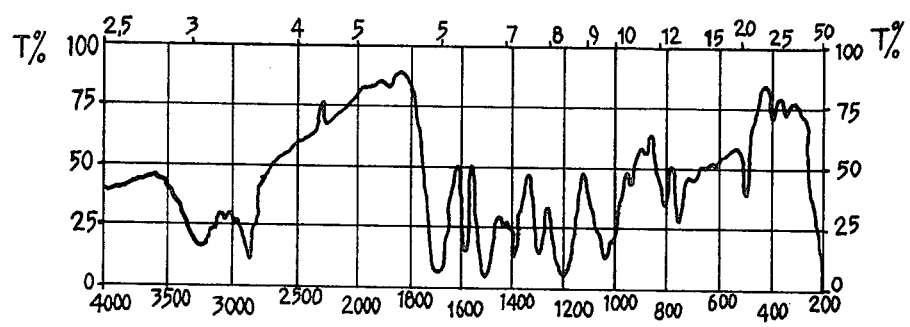

United States Patent [19]

Balestrini

[11] 4,243,560

[45] Jan. 6, 1981

[54] METHOD OF RECOVERING POLYOLS FROM SCRAP POLYURETHANE FOAM

[75] Inventor: Augusto Balestrini, Turin, Italy

[73] Assignee: Centro Ricerche Fiat S.p.A., Turin, Italy

[21] Appl. No.: 27,136

[22] Filed: Apr. 4, 1979

[30] Foreign Application Priority Data

Apr. 7, 1978 [IT] Italy ................. 67768 A/78

[51] Int. Cl.$^3$ .................... C07C 29/74; C08J 11/04
[52] U.S. Cl. .................................. 260/2.3; 568/868
[58] Field of Search .................... 260/2.3; 568/868

[56] References Cited

U.S. PATENT DOCUMENTS

| | | | |
|---|---|---|---|
| 2,998,395 | 8/1961 | Albert et al. | 260/2.3 |
| 3,983,087 | 9/1976 | Tucker et al. | 260/2.3 |

FOREIGN PATENT DOCUMENTS 805561 12/1958 United Kingdom ............. 260/2.3

*Primary Examiner*—Allan Lieberman
*Attorney, Agent, or Firm*—Sughrue, Rothwell, Mion, Zinn and Macpeak

[57] ABSTRACT

Scrap foam of flexible or semi-rigid polyurethane is pyrolized at 450°–800° C., preferably 600° C., in the absence of air and of any added reactive agents or catalysts. The residence time may be from 3 minutes to one hour, preferably about 5 minutes. A distillate is obtained comprising an aqueous phase and an organic phase. The latter essentially consists of alcohols and polyols and may be re-used as such for preparing polyurethane resins.

6 Claims, 2 Drawing Figures

METHOD OF RECOVERING POLYOLS FROM SCRAP POLYURETHANE FOAM

This invention relates to a method of recovering polyols from scrap polyurethane foam with the view to obtain a liquid product which contains said polyols and which may be re-used as such, without further purification, in the preparation of polyurethanes.

It is known that polyols and similar hydroxylated compounds may be obtained from scrap polyurethane foam by hydrolysis of the latter at elevated temperature in the presence of reactive agents or catalysts such as a polyol (U.S. Pat. Nos. 2,937,151 and 3,300,417), a liquid carboxylic acid (U.S. Pat. No. 3,109,824), an amine (U.S. Pat. Nos. 3,117,940 and 3,404,103), or an aqueous strong base accompanied by dimethylsolfoxide (U.S. Pat. No. 3,441,616).

It is an object of this invention to provide a method by which a re-usable, polyols-containing liquid product may be obtained from scrap foam of flexible or semi-rigid polyurethanes by a pure pyrolysis, so that the costs of the recovery may be drastically reduced.

Accordingly, this invention provides a method of recovering polyols from a scrap polyurethane foam by thermal treatment, characterized by the steps of: pyrolising a scrap foam of a flexible or semi-rigid polyurethane at a temperature of from about 450° C. to about 800° C. with a residence time of from about 3 minutes to 1 hour, in the absence of air and in the absence of any added reactive agents or catalysts: at the same time collecting and condensing the gaseous decomposition products evolving from the mass being pyrolized, thereby obtaining a liquid condensate comprising a heavy aqueous phase and a light organic phase; and recovering the organic phase.

Preferably, the pyrolysis temperature is from 500° C. to 700° C., still preferably about 600° C. The residence time at these temperatures is preferably from 5 to 10 minutes.

In accordance with a further aspect of this invention, the recovered organic phase is reacted, without purification treatment, with an organic diisocyanate to produce a polyurethane, particularly a polyurethane foam. Preferably, the organic phase is not used alone, but rather blended with other polyol.

The pyrolysis process may be effected batchwise or continuously. As in the prior processes, the scrap foam is preferably used in comminuted form. The pyrolysis chamber is isolated from the external atmosphere and is equipped with a temperature sensor and with an outlet pipe for gaseous products connected to a water-cooled condenser. The condensate may be collected in a decanter, from which the supernatant organic phase may easily be recovered. Once the scrap foam is loaded into the pyrolysis chamber it is not absolutely necessary to flush the charge with an inert gas (e.g. nitrogen) to expel air from the cells of the foam; actually, as the temperature rises to the high value (at least 450° C.) selected for the pyrolysis, the originally present air is inherently expelled practically totally through the outlet pipe mentioned above, so that no oxydation (combustion) of the polyurethane in the chamber occurs during pyrolysis.

The residence time indicated hereinbefore does not include the preheating period during which the temperature of the charge rises to the value selected for the pyrolysis.

It is essential that the polyurethane be of flexible or semi-rigid type, as distinct from rigid polyurethanes. With this proviso, the nature of the polyols from which the starting foam was obtained does not appear to be critical. Polyurethane foams used in upholstery are very frequently made from trifunctional hydroxylated polyethers resulting from polyaddition reactions of organic oxides (e.g. ethylene oxide or propylene oxide) initiated by glycerol. Foams of this character may very successfully be treated in accordance with this invention.

Figure 2:
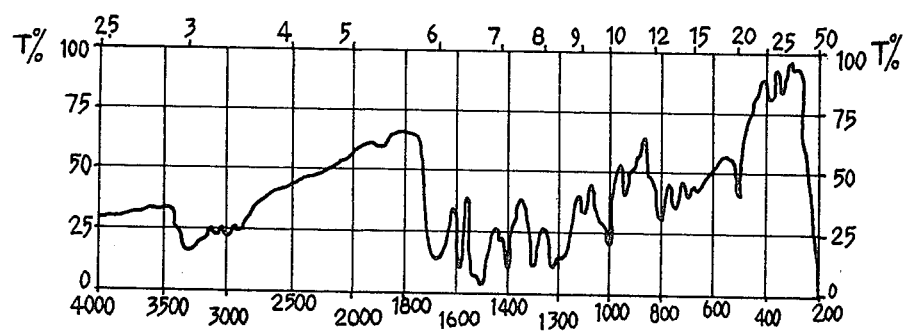

In the accompanying drawing:

FIG. 1 shows the IR-spectrum of a polyurethane obtained with the use, as polyol, of an organic phase obtained in accordance with this invention, and FIG. 2 shows, for comparison purposes, the IR-spectrum of a polyurethane obtained from an equivalent amount of ethylene glycol.

In the Figures, the value reported on the upper basis of each diagram denote the wavelength in microns, the values reported on the lower basis denote the corresponding wavenumber in cm$^{-1}$, and the ordinates denote percent transmittance. The plotted curves were obtained with the Perkin-Elmer Mod. 180 instrument.

EXAMPLE

The pyrolysis chamber is a cylindrical vertical retort of steel, of an inner diameter of 6 cm and a height of 15 cm, equipped with an airtight cover. A thermometric probe extends from the cover into the retort, and a gas outlet pipe extends from the cover to a water-cooled condenser.

A charge of 100 g comminuted polyurethane foam scrap is loaded into the cylinder, comprising both flexible polyurethane (foam density 0.35 g/cu.cm.) and semi-rigid polyurethane (foam density 0.55 g/cu.cm.). Trifunctional hydroxylated polyethers of a molecular weight of 2,500 and about 5,000 respectively, were used for manufacturing the flexible and semi-rigid polyurethane; the diisocyanate was 1,5-naphthalene diisocyanate.

The retort was introduced into a correspondingly small electric muffle furnace and heated to 600° C.; the residence time at this temperature was 5 minutes. The condenser temperature was 15° C. As a result, 53 g condensate were obtained and decanted, yielding 46.7 g organic phase and 6.3 g aqueous phase. The solid residue in the retort was 21.7 g. By difference, 25.3 g uncondensable gases were discharged through the condenser to the atmosphere.

Mass-gaschromatographic analysis of the organic phase showed the following composition:

| Peaks characteristic of: | wt. % |
| --- | --- |
| Acetone | 1.2 |
| Isopropyl alcohol | 6.45 |
| 3-Pentanol | 0.82 |
| 2-Methyl-2-propanol | 7.89 |
| 2-Ethyl-4-methyl-1,3-dioxolane | 2.1 |
| Unidentified | 1.12 |
| 3-Methoxy-1-butanol | 11.8 |
| Unidentified | 2.82 |
| 2-Isopropoxy-1-propanol | 2.27 |
| Fragmentation typical of alcohols and glycols | 10.45 |
| Ethoxy-propoxy-propanol | 5.94 |
| Further fragmentation typical of alcohols and glycols | 31.04 |

Continuing the procedure, 6.2 g of this organic phase were dissolved in 40 ml dimethylsulfoxide and added to a rapidly stirred solution of 25 g of methylene-bis(4-phenyl diisocyanate) in 40 ml cyclopentanone. The mixture was heated at 115° C. during 1.5 hour and then poured in water to precipitate the expected polyurethane. FIG. 1 shows IR-spectrum of this polyurethane. In parallel, a similar procedure was followed with the use of 6.2 g ethylene glycol in lieu of the said organic phase (see W. R. Sorenson, "Preparative Methods of Polymer Chemistry", 2-nd Edition, Interscience Publishers), and the IR-spectrum of this polyurethane is reproduced in FIG. 2. Needless to add that the two spectra are significantly similar to each other, at least to an extent sufficient to confirm that the organic phase obtained in this Example may be used in commercial practice (either alone, or in addition to other polyols) for manufacturing polyurethane resins.

Effects of pyrolysis temperature

Tests similar to that described in Example 1 above were effected on further charges of the polyurethane foam, treated at different temperatures during 1 hour. The results are tabulated below:

| Pyrolysis temperature (°C.) | Organic phase (wt. %) | Aqueous phase (wt. %) | Residue (wt. %) |
| --- | --- | --- | --- |
| 353 | 7.6 | 5.6 | 76.6 |
| 391 | 14.3 | 10.6 | 60.3 |
| 419 | 24.6 | 11.0 | 46.3 |
| 457 | 22.0 | 12.0 | 48.0 |
| 466 | 30.0 | 10.0 | 37.0 |
| 552 | 34.3 | 9.7 | 24.6 |
| 600 | 51.7 | 6.0 | 20.3 |
| 673 | 41.0 | 8.3 | 26.6 |
| 730 | 42.7 | 8.7 | 23.6 |
| 769 | 41.3 | 8.0 | 23.6 |
| 817 | 44.3 | 8.6 | 22.6 |

The values tabulated above show that the maximum yield of organic phase and the minimum of solid residue were obtained by pyrolysis at 600° C.

Effects of residence time

Accordingly, further charges of the foam were treated at 600° C. during different periods. The results (including Example 1) are tabulated below:

| Residence time (minutes) | Organic phase (wt. %) | Aqueous phase (wt. %) | Residue (wt. %) |
| --- | --- | --- | --- |
| 30 | 49.7 | 3.0 | 18.3 |
| 15 | 47.3 | 7.7 | 19.3 |
| 5 (Ex.1) | 46.7 | 6.3 | 21.7 |
| 1.2 | 45.7 | 6.3 | 22.3 |

The aqueous phase is always satisfactorily free of chemical pollutants. The residue may be utilized as fuel; its calorific value typically amounts to about 6,000 Cal/kg.

What is claimed is:

1. A method of recovering polyols from scrap polyurethane foam by thermal treatment, comprising the steps of: pyrolizing a comminuted scrap foam of a flexible or semi-rigid polyurethane at a temperature of from about 450° C. to about 800° C. with a residence time at the temperature of from about 3 minutes to about 1 hour in the absence of air in the absence of any added reactive agents or catalysts; at the same time collecting and condensing the gaseous decomposition products evolving from the mass being pyrolized, thereby obtaining a liquid condensate comprising a heavy aqueous phase and a light organic phase; and recovering the organic phase.

2. A method according to claim 1, wherein the temperature is from 500° C. to 700° C.

3. A method according to claim 2, wherein the temperature is 600° C.

4. A method according to claim 2 or 3, wherein the residence time at the stated temperature is 5 to 10 minutes.

5. A method according to claim 1, 2 or 3, wherein the method includes reacting the recovered organic phase without purification treatment with an organic diisocyanate to produce a polyurethane resin.

6. A method according to claim 4, wherein the method includes reacting the recovered organic phase without purification treatment with an organic diisocyanate to produce a polyurethane resin.

* * * * *